United States Patent [19]

Araki et al.

[11] 4,154,708

[45] May 15, 1979

[54] ELECTROPHORETIC COATING COMPOSITIONS

[75] Inventors: Yoshihiko Araki, Kawasaki; Yutaka Otsuki, Yokohama; Hideo Kawaguchi, Kawasaki, all of Japan

[73] Assignee: Nippon Oil Co., Ltd., Tokyo, Japan

[21] Appl. No.: 871,588

[22] Filed: Jan. 23, 1978

[30] Foreign Application Priority Data

Jan. 22, 1977 [JP] Japan .................. 52-5432
Mar. 14, 1977 [JP] Japan ................. 52-26964

[51] Int. Cl.$^2$ .......................... C09D 3/36; C09D 3/74; C09D 5/40
[52] U.S. Cl. .................. 260/5; 204/181 R; 204/182; 204/185; 260/23.7 A; 260/29.7 N; 260/29.7 H; 260/894
[58] Field of Search ............ 204/181 R, 185, 182; 260/23.7 A, 894, 29.7 N, 29.7 H, 5

[56] References Cited

U.S. PATENT DOCUMENTS

| | | | |
|---|---|---|---|
| 3,609,111 | 9/1971 | Kumanotani .................... | 204/181 R |
| 3,689,446 | 9/1972 | Furuya et al. ................... | 260/23.7 A |
| 3,935,140 | 1/1976 | Go et al. ......................... | 204/181 R |
| 3,939,110 | 2/1976 | Colberg et al. .................. | 204/181 R |
| 3,944,512 | 3/1976 | Broecker et al. ................. | 204/181 R |
| 3,996,174 | 12/1976 | Broecker et al. ................. | 260/23.7 A |
| 4,008,140 | 2/1977 | Fritsche ........................... | 204/181 R |
| 4,024,095 | 5/1977 | Broecker et al. ................. | 260/23.7 A |
| 4,072,536 | 2/1978 | Otsuki et al. .................... | 260/23.7 A |

*Primary Examiner*—Ronald W. Griffin
*Attorney, Agent, or Firm*—Frank J. Jordan

[57] ABSTRACT

An electrophoretic coating composition comprising as an essential component a film-forming ingredient containing (1) an adduct of an α,β-unsaturated dicarboxylic acid or anhydride thereof to a mixture of a liquid conjugated diene polymer and a polyunsaturated rubber or an 1,2-polybutadiene resin, (2) a mixture of said adduct (1) and an adduct of an α,β-unsaturated dicarboxylic acid or anhydride thereof to a natural drying oil or thermally polymerized product thereof or (3) an adduct of the same acid or anhydride to a mixture of the liquid conjugated diene polymer, 1,2-polybutadiene or polyunsaturated rubber and natural drying oil or thermally polymerized product thereof. In one embodiment, the adducts (1), (2) and (3) may be substituted with modified ones prepared by reaction of the former with an alcohol, respectively.

11 Claims, No Drawings

ELECTROPHORETIC COATING COMPOSITIONS

This invention relates to an electrophoretic coating composition having excellent throwing power, edge covering power, producibility of smooth coatings therefrom and, if desired, physical properties.

There have heretofore been used as electrophoretic coating materials aqueous solutions or dispersions prepared by neutralizing with a suitable base an acid group-containing compound such as a maleinated oil, maleinated liquid polybutadiene or epoxy ester and then dissolving or dispersing the thus neutralized compound in water to obtain the aqueous solution or dispersion in a predetermined concentration.

Such electrophoretic coating materials are characterized in that they enable coating operations using themselves to be performed automatically and they also make it possible to coat therewith the configuratively complicated, edged and like portions of a structure which are difficult to coat with conventional non-electrophoretic coating materials as in the case of coating structures such as automobiles. Thus, it is appreciated that they will remarkably improve structures in corrosion resistance if the structures are coated therewith. The capability of coating the recessed portions is generally called "throwing power" of electrophoretic coating materials and the capability of coating the edge portions is called "edge covering power;" these capabilities are very important requisites for producing coatings having improved corrosion resistance. In general, the aforesaid coating capabilities are considerably improved by using a considerably high molecular weight resin in a coating material, while the resulting coatings formed thereof tend to lack surface smoothness, produce pin holes and deteriorate in corrosion resistance.

Since maleinated liquid 1,2-polybutadienes (1,2-butadiene polymers) are excellent in corrosion resistance, they have recently been increasingly used in the preparation of electrophoretic coating materials. However, conventionally used maleinated liquid 1,2-polybutadienes are disadvantageous in that if they are treated to be improved in throwing power they will not result in forming coatings having smooth surface; thus, they are incorporated with a liquid 1,4-polybutadiene, natural drying oil, phenol resin, melamine resin and the like for practical use as an essential component for an electrophoretic coating material. However, even if the aforesaid conventional essential ingredients are used in the preparation of electrophoretic coating materials, the resulting electrophoretic coating materials will not have fully excellent throwing power nor do they have satisfactory edge covering power in any case.

On the other hand, Japanese Patent Application Laying-Open Gazette No. 82323/76 discloses a coating composition which may deposit under high voltage and produce a protective coating effectively resistant to corrosion, the coating composition being prepared by blending a liquid olefin polymer oil with, for example, a decomposed rubber having a comparatively low average molecular weight of 4,500 to 20,000 and addition reacting the resulting blend with maleic anhydride or the like; however, such coating compositions are hardly improved in edge covering power and throwing power.

In an attempt to improve liquid 1,2-polybutadiene type electrophoretic coating materials in throwing power and edge covering power, the present inventors made intensive studies and, as a result of their studies, have found that a liquid 1,2-conjugated diolefin polymer or copolymer can be remarkably improved in throwing power and edge covering power without impairing the smoothness of surface of the resulting coating formed thereof by incorporating thereinto a member selected from the group consisting of (i) so-called "polyunsaturated rubbers" such as polymers of butadiene and/or isoprene and (ii) 1,2-polybutadiene resins having a molecular weight of at least 50,000, a crystallization degree of 5–50% and a softening point of 50°–150° C. This invention is based on this finding or discovery. The term "polyunsaturated rubbers" used herein is intended to mean rubbers having many ethylenic (double) bonds.

An object of this invention is to provide an electrophoretic coating composition comprising as an essential component a film-forming ingredient prepared by:

addition reacting a mixture of (a) 99–90 parts by weight of a liquid conjugated diene polymer having at least 50% of 1,2-linkage and a molecular weight of 500–3,000 and (b) 1–10 parts by weight of a member selected from the group consisting of (i) polyunsaturated rubbers having a molecular weight of at least 50,000 and (ii) 1,2-polybutadiene resins having a molecular weight of at least 50,000, a crystallization degree of 5–50% and a softening point of 50°–150° C., with 5–30% by weight, based on said mixture, of an $\alpha,\beta$-dicarboxylic acid or anhydride thereof to obtain an adduct (P) with said acid or anhydride thereof.

neutralizing with an alkaline compound the thus-obtained adduct (P) or a modified adduct (P') prepared by reaction of the adduct (P) with an alcohol and then dispersing or dissolving the thus-neutralized adduct (P) or (P') in water to obtain the film-forming ingredient.

Another object of this invention is to provide an electrophoretic coating composition comprising as an essential component a film-forming ingredient prepared by dispersing or dissolving in water (I) 30–100 parts by weight of at least one member selected from the group consisting of (1) a neutralized adduct (P) prepared by:

addition reacting a mixture of (a) 99–90 parts by weight of a liquid conjugated diene polymer having at least 50% of 1,2-linkage and a molecular weight of 500–3,000 and (b) 1–10 parts by weight of a member selected from the group consisting of (i) polyunsaturated rubbers having a molecular weight of at least 50,000 and (ii) 1,2-polybutadiene resins having a molecular weight of at least 50,000 a crystallization degree of 5–50% and a softening point of 50°–150° C., with 5–30% by weight, based on said mixture, of an $\alpha,\beta$-dicarboxylic acid or anhydride thereof to obtain an adduct (P), neutralizing the thus-obtained adduct (P) with an alkaline compound to obtain the neutralized adduct (P) and (2) a neutralized modified adduct (P') prepared by:

reacting the adduct (P) with an alcohol to produce a modified adduct (P') and then neutralizing the thus-produced modified adduct (P') with an alkaline compound to obtain the neutralized modified adduct (P'), and (II) up to 70 parts by weight of at least one member selected from the group consisting of (1) a neutralized adduct (Q) prepared by:

addition reacting a natural drying oil or a thermally polymerized product thereof with 5–30% by weight, based on said drying oil or thermally polymerized product thereof, of an α,β-unsaturated dicarboxylic acid or anhydride thereof to obtain an adduct (Q), neutralizing the thus-obtained adduct (Q) with an alkaline compound to obtain the neutralized adduct (Q) and (2) a neutralized modified adduct (Q') prepared by:

reacting the adduct (Q) with an alcohol to produce a modified adduct (Q') and then neutralizing the thus-produced modified adduct (Q') with an alkaline compound to obtain the neutralized modified adduct (Q').

Still another object of this invention is to provide an electrophoretic coating composition comprising an essential component a film-forming ingredient prepared by:

addition reacting a mixture of (a) 99–90 parts by weight of a liquid conjugated diene polymer or copolymer having at least 50% of 1,2-linkage and a molecular weight of 500–3,000, (b) 1–10 parts by weight of a member selected from the group consisting of (i) polyunsaturated rubbers having a molecular weight of at least 50,000 and (ii) 1,2-polybutadiene resins having a molecular weight of at least 50,000, a crystallization degree of 5–50% and a softening point of 50°–150° C. and (c) up to 70 parts by weight of a natural drying oil or a thermally polymerized product thereof, with 5–30% by weight, based on said mixture, of an α,β-unsaturated dicarboxylic acid or anhydride thereof to obtain an adduct (R), neutralizing with an alkaline compound at least one member selected from the group consisting of the thus-obtained adduct (R) and a modified adduct (R') prepared by reaction of the adduct (R) with an alcohol and then dispersing or dissolving the thus-neutralized product in water to obtain the film-forming ingredient.

The liquid conjugated diene polymers or copolymers (a) referred to herein include polymers and copolymers of one or more of conjugated dienes usually having 4–10 carbon atoms such as butadiene, isoprene and piperylene and also include copolymers of at least one of said monomers with at least one of ethylenically unsaturated aliphatic and aromatic vinyl monomers (these vinyl monomers being used in amounts of not higher than 50 mol % of said conjugated dienes) such as isobutylene, diisobutylene, styrene, α-methylstyrene, vinyltoluene and divinylbenzene. These polymers may be produced by heretofore known methods. Typical of the known methods is a method comprising anionically polymerizing at least one conjugated diolefin having 4–10 carbon atoms alone or together with at least one aromatic vinyl monomer (such as styrene, α-methylstyrene, vinyltoluene or divinylbenzene) in amounts of preferably up to 50 mol % of the conjugated diolefins at 0°–100° C. in the presence of an alkali metal compound or organic alkali metal compound as the catalyst. In this case, in order to control the molecular weight of the resulting products, inhibit gel formation and obtain light-colored products, it is recommended to use the following polymerization method: a chain transfer polymerization method in which an organic alkali metal compound such as benzyl sodium, is used as the catalyst and an alkylaryl group-containing compound such as toluene, is used as a chain transfer agent (U.S. Pat. No. 3,789,090); a living polymerization method wherein a polycyclic aromatic compound such as naphthalene, is used as the activator in tetrahydrofuran as the solvent, and an alkali metal such as sodium, is used as the catalyst (Japanese Patent Gazettes Nos. 17485/67 and 27432/68) and a polymerization method wherein an aromatic hydrocarbon such as toluene or xylene, is used as the solvent, a metal such as sodium, in dispersed form is used as the catalyst and an ether such as dioxane, is used for control of the molecular weight of the resulting polymer (Japanese Patent Gazettes Nos. 7446/57, 1245/58 and 10188/59). Among the polymers (a) used herein, butadiene polymers and butadiene/styrene copolymers are preferred. In addition, there may also be used polymers and copolymers prepared by modifying a part of these polymers and copolymers with an oxygen-containing or nitrogen-containing compound, the polymers and copolymers so prepared being illustrated by those containing oxygen introduced in the molecular chain and those containing a hydroxyl or carboxyl group introduced at the end of the molecular chain.

The polymers and copolymers used herein are usually liquid or semi-solid ones having at least 50% of 1,2-linkage and a molecular weight of 500–3,000. If they were to contain less than 50% of 1,2-linkage, then they would form coatings having a low crosslinking density and unsatisfactory resistance to chemicals and solvents. If their molecular weight were less than 500, then the resulting coatings would not practically be useful because of low strength; while if it were more than 3,000, then the resulting coatings would not be suitable for the purpose of this invention because of unsatisfactory surface smoothness of the coatings.

The polysaturated rubbers (b)(i) are those which are solid at ambient temperatures and have a molecular weight of at least 50,000. They include polymers and copolymers of at least one of conjugated dienes preferably having 4 to 10 carbon atoms such as butadiene, isoprene and piperylene and also include copolymers of at least one of said conjugated dienes with a vinyl monomer such as styrene, β-methylstyrene or isobutylene as the comonomer. These polymers or copolymers are obtained by polymerizing said monomers or copolymerizing said monomers with said comonomers to a great extent in the presence of various polymerization catalysts. The polyunsaturated rubbers are already marketed and they typically include butadiene rubber (supplied under the tradenames of DIENE, NIPOL BR and JSRBR by Asahi Kasei Co., Ltd., Nippon Zeon Co., Ltd. and Nippon Synthetic Rubber Co., Ltd., respectively), styrene/butadiene rubbers (supplied under the tradename of SBR by Nippon Synthetic Rubber Co., Ltd.) and polyisoprene rubbers and also include natural rubber.

The 1,2-polybutadiene resins (b)(ii) used herein are butadiene polymers in highly polymerized form which are solid at ambient temperatures and have a crystallization degree of 5–50% and a softening point of 50° to 150° C. They are already marketed and typically include 1,2-polybutadiene resins supplied under the tradenames of JSR.RB810, JSR-820, etc. by Nippon Synthetic Rubber Co., Ltd. If the molecular weight of the polyunsaturated rubbers and 1,2-polybutadiene resins were less than 50,000, then they would be less effective in improving the liquid polybutadienes in throwing power and edge covering power when added to said liquid polybutadienes.

The molecular weight referred to herein are a number average molecular weight as determined by a steam pressure osmometer. It is preferable that the polyunsaturated rubbers having a molecular weight of at least 50,000, preferably at least 100,000 according to this invention, should have a Mooney viscosity of 10-100.

In a case where the 1,2-polybutadiene resins are attempted to be used as the component (b), they may be used together with or without a solvent or an extender oil.

The $\alpha,\beta$-unsaturated dicarboxylic acids and anhydrides thereof include aliphatic dicarboxylic acids and anhydrides thereof, such as maleic acid, maleic anhydride, citraconic acid, citraconic anhydride, chloromaleic acid and chloromaleic anhydride.

If the amount of said dicarboxylic acid or anhydride thereof addition reacted with said mixture of the components (a) and (b) or the components (a), (b) and (c) is less than 5% by weight of the mixture, then the resulting adduct will have unsatisfactory solubility and dispersibility in water thereby rendering it unsuitable for use in the preparation of electrophoretic coating compositions of this invention. On the other hand, if the amount of the acid or anhydride thereof addition reacted is more than 30% by weight, then the resulting adduct will be satisfactory in water solubility but unsatisfactory in water resistance or will be too high in viscosity as a resin, thereby rendering it unsuitable for use in the preparation of the coating composition of this invention.

In one aspect this invention is characterized in that a mixture of the liquid diene polymer or copolymer with the polyunsaturated rubber of 1,2-polybutadiene resin in a predetermined mixing ratio is addition reacted with the $\alpha,\beta$-unsaturated dicarboxylic acid or anhydride thereof. The addition reaction may usually be effected by adding said acid or anhydride thereof to said polymeric reactants in an inert solvent capable of dissolving the polymeric reactants, or it may be effected without the use of a solvent. In case where the solvent is used, those which may preferably be used herein include benzene, toluene, xylene and other solvents of petroleum origin. The addition reaction may usually be effected at 100°-300° C., preferably 150°-250° C. Antigelling agents, which are usually used in the practice of the reaction, include di-t.-butyl-p-cresol, hydroquinone, t.-butyl-p-catechol and paraphenylenediamine derivatives and are added in amounts of 0.1-2 parts by weight. These additives are disclosed by the present inventors in West German Patent Application Laying-Open Gazette (Deutsche Offenlegungsschrift) No. 2362534.

In this invention, the polyunsaturated rubber or 1,2-polybutadiene resin may be used in amounts of 1-10 parts by weight per 99-90 parts by weight of the liquid conjugated diene polymer or copolymer. The use of said rubber or diene polymer or copolymer in less amounts than 1 part by weight will not result in the production of a coating composition having satisfactory throwing power and edge covering power, while the use thereof in more amounts than 10 parts by weight will result in the formation of gel in the course of the addition reaction with the $\alpha,\beta$-unsaturated dicarboxylic acid or anhydride thereof and will result in the production of coating compositions which will not provide coatings having a smooth surface, whereby coating compositions capable of forming excellent coatings thereof are not obtained.

In the invention, the adduct (P) thus obtained or the modified adduct (P') prepared by the reaction of the former with an alcohol, is neutralized with an alkaline compound and then dispersed or dissolved in water to obtain the film-forming ingredient for use as an essential component of the electrophoretic coating composition.

In another aspect, this invention is characterized in that the adduct (P) or (P') neutralized with an alkaline compound is mixed with the adduct (Q) of 5-30% by weight of an $\alpha,\beta$-unsaturated dicarboxylic acid or anhydride thereof to a drying oil or thermally polymerized product thereof or with the modified adduct (Q') prepared by reaction of the adduct (Q) with an alcohol, in a predetermined ratio of the adduct (P) or (P') to the adduct (Q) or (Q'), and the resulting mixture is then dispersed or dissolved in water to form a film-forming ingredient which is used as an essential component in the preparation of electrophoretic coating compositions.

The natural drying oils or thermally polymerized products thereof used herein include linseed oil, tung oil, dehydrated castor oil, safflower oil and soyabean oil as well as so-called thermally polymerized products thereof prepared by thermally modifying said oils at 200°-300° C., and also include mixtures of said oils and thermally polymerized products thereof. The $\alpha,\beta$-dicarboxylic acids and anhydrides thereof used include maleic acid, maleic anhydride and the like as mentioned before.

If the amount of the $\alpha,\beta$-dicarboxylic acid or anhydride thereof addition reacted is outside the range of 5-30% by weight, then the resulting coating composition will be unsatisfactory as previously mentioned. The addition reaction with the $\alpha,\beta$-dicarboxylic acid or anhydride thereof may be effected at 100°-300° C., preferably 150°-250° C. In addition, the same solvent as previously mentioned may be used.

In still another aspect, this invention is characterized in that a mixture of the liquid conjugated diene polymer or copolymer (a), the 1,2-polybutadiene resin (b) and the natural oil or thermally polymerized product thereof (c), is addition reacted with an $\alpha,\beta$-dicarboxylic acid or anhydride thereof to obtain an adduct (R), the thus-obtained adduct (R) or a modified adduct (R') prepared by reaction of the adduct (R) with an alcohol is neutralized with an alkaline compound, and the thus neutralized adduct (R) or (R') is then dispersed or dispersed in water to obtain a film-forming ingredient which is an essential component of electrophoretic coating compositions. In this case where a mixture of the materials (a), (b) and (c) are reacted with the dicarboxylic acid or anhydride thereof, the same specified organic solvents as previously mentioned may be used, the reaction may be effected at 100°-300° C., preferably 150°-250° C. and, if necessary, the same anti-gelling agents as the above may be used.

This case indicates that after being mixed together, the materials (a), (b) and (c) may simultaneously be addition reacted with the acid or anhydride thereof since the condition under which a mixture of the diene polymer (a) and 1,2-polybutadiene resin (b) is addition reacted is substantially identical with that under which a natural drying oil is addition reacted.

Either the use of the adduct (Q) or (Q') together with the adduct (P) or (P'), or the use of the adduct (R) is intended to not only improve the resulting coatings in weather-proofing and physical properties but also produce a desired coating material at a lower cost. The use of more than 70% by weight of the adduct (Q), (Q') or the portion of the adduct (R) corresponding to the adduct (Q) or (Q') will result in deteriorating the resulting coating composition in throwing power and also deteriorating the resulting coatings in chemical resistance, alkali resistance, water resistance and corrosion resistance in spite of the fact that these power and resistances are characteristic of the liquid 1,2-diene polymer or copolymer, thereby rendering such coating composition and coatings formed thereof unsuitable for practical use.

In the practice of this invention, more than 90 wt.%, usually substantially all, of the α,β-dicarboxylic acid participated in the reaction may be addition reacted with one or more of the components (a), (b) and (c).

According to this invention, as previously stated, the three kinds of adducts (1. the adduct (P), 2. the adduct (C), 3. the adduct (R)) as well as the modified adducts (P'), (Q') and (R') are water solubilized by neutralization thereof with an alkaline compound. The adducts (P) and (C), after being mixed together, may simultaneously be reacted with an alcohol and may also simultaneously be water solubilized with an alkaline compound.

The alcohols referred to herein usually include aliphatic alcohols such as methanol, ethanol, propanol and butanol; Cellosolves such as ethylcellosolve (ethyl glycol), propylcellosolve (propyl glycol) and butylcellosolve (butyl glycol); ketonic alcohols such as diacetone alcohol; They may usually be reacted at 0°-100° C. The addition reacted acid in the adducts (P), (Q) and (R) is usually semi-esterified by reaction with the alcohol.

The acid anhydride introduced into the adducts (P), (Q) and (R) may be subjected to ring breakage prior to the neutralization.

According to this invention, all of the aforesaid adducts (P), (P'), (Q), (Q'), (R) and (R') are neutralized with an alkaline compound for dispersion or dissolution thereof in water. In this neutralization, 0–50 parts by weight of a water soluble adjuvant for the dissolution per 100 parts by weight of the adduct may usually be mixed with an aqueous solution of an alkaline compound usually at 0°–100° C.

The water soluble adjuvant for the dissolution referred to herein include the aforesaid aliphatic alcohols. Cellosolves, ketonic alcohols and alcohol ethers such as 4-methyl-4-methoxypenthanone-2 and ethylene glycol dimethyl ether.

The alkaline compounds used herein include ammonia; amines such as diethylamine, triethylamine, monoethanolamine, diethanolamine and triethanolamine; and inorganic alkalies such as potassium hydroxide, and aqueous solutions thereof.

In addition, the coating compositions of this invention may, in many cases, contain various pigments and additives for practical use. The pigments used herein may be stable ones which contain little of water soluble ingredients and are not swollen with water as contained in water soluble paints. They include titanium dioxide, lithopone, calcium carbonate, barium sulphate, mica, clay, rouge, strontium, chromate, carbon black, Hansa Yellow and mixtures thereof. The pigments may be used in amounts of 0–150 parts, preferably 20–50 parts, by weight per 100 parts by weight of the adduct or modified adduct according to this invention.

These pigments may be incorporated into a medium to form a pigment paste which may be blended with the film-forming ingredient according to this invention.

The aforesaid film-forming ingredients and pigments may be in a concentration of 2–20%, preferably 5–15%, in water when used in the electrophoretic coating material.

The electrophoretic coating compositions of this invention may be used in admixture with other ones containing a film-forming ingredient.

This invention will be better understood by the following non-limitative Examples wherein all parts and percentages are by weight unless otherwise specified.

EXAMPLE 1

A 50-liter stainless steel-made autoclave provided with a stirrer was purged with nitrogen and then charged with 2.5 mol of benzyl sodium, 30 mol of toluene and 30 l of benzene to form a mixture which was heated to 30° C., incorporated with 20 l of 1,3-butadiene over a period of time of 4.5 hours while maintaining the material at 30° C., and then incorporated with 200 ml of methanol to terminate the polymerization reaction. The resulting reaction mixture was incorporated with 2 Kg of activated clay, vigorously agitated and filtered to obtain a transparent polymer solution containing no alkaline compound. The polymer solution so obtained was distilled at a reduced pressure to distil off the unreacted 1,3-butadiene, toluene and benzene thereby to obtain a butadiene polymer (A) having an iodine value of 420, 55% of 1,2-linkage, a number average molecular weight of 800 and a viscosity of 9 poise at 25° C. The yield of the butadiene polymer (A) was 87% of the amount of the butadiene charged. The number average molecular weight was measured by the use of a steam pressure osmometer (Mecrolab Model 301 A Osmometer) and the double bonds were calculated from absorbancy index (Morero) after measurement of infra-red absorption spectra (Literature cited: Reported by Otsuka, "Kobunshi/Polymers, Japan," 13, page 252, 1964).

A 2-liter stainless steel-made autoclave was purged with nitrogen and charged with 175 g of a 10 wt.% xylene solution of diene NF-35 (produced by Asahi Kasei Co., Ltd., Japan) having a molecular weight of about 200,000 and a Mooney viscosity of about 35, 982.5 g of the butadiene polymer (A), 2 g of Antigen 3C (produced by Sumitomo Chemical Industry Co., Ltd., Japan) and 205 g of maleic anhydride to form a mixture which was reacted at 195° C. for 6 hours thereby obtaining a reaction mixture. Antigen 3C is N-phenyl-N'-isopropyl-p-phenylenediamine represented by the following formula

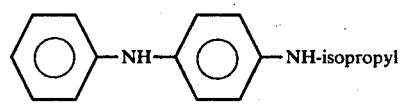

The reaction mixture so obtained was heated to distil the unreacted maleic anhydride and was heated to distil the unreacted maleic anhydride and xylene at a reduced pressure thereby to obtain a maleinated polybutadiene (A') having an acid value of 97 and a bubble viscosity of $Z_1$–$Z_2$ (75 wt.% solution, 25° C.). A "bubble viscosity" is one as determined from Gardner-Holdt system, ASTM D-154-50.

To a 5-liter separable flask provided with a reflux condenser were added 500 g of the maleinated polybutadiene (A'), 94.7 g. of triethylamine and 100 g of deionized water to form a mixture which was vigorously agitated at 60° C. for 60 minutes, incorporated with 100 g of n-butylcellosolve and 38.6 g of deionized water at room temperature and agitated thereby obtaining a varnish (1) containing 60% of resinous solid matter. Three hundred (300) grams of the varnish (1) so obtained were kneaded with 66.1 g of titania, 2.2 g of carbon black and 2.2 g of strontium chromate by the use of a 3-roll mill to obtain a kneaded mixture. The kneaded mixture so obtained was incorporated with 1717 g of deionized water to prepare an aqueous electrophoretic solution having a solid matter content of 12%. The aqueous solution so prepared was introduced into a 2-liter stainless steel-made flask. The flask was used not only as an electrodepositing bath but also as the cathode while a steel plate treated with zinc phosphate (this phosphatized steel plate being produced by Nippon Test Panel Co., Ltd., Japan) was used as the anode, thus effecting electrophoretic coating by deposition on the anode. The test results are shown in Table 1.

Comparative example 1

A 2-liter stainless steel-made autoclave provided with a stirrer was charged with 1000 g of butadiene polymer (A), 205 g of maleic anhydride, 12 kg of xylene and 2 g of Antigen 3C to form a mixture which was reacted at 195° C. for 6 hours under a nitrogen stream to obtain a reaction mixture. The thus-obtained reaction mixture was distilled at a reduced pressure to distil off the unreacted maleic anhydride and the xylene thereby obtaining a maleinated polybutadiene (B) having an acid value of 97 and a bubble viscosity of V-W.

A 2-liter separable flask provided with a reflux condenser was charged with 180 g of the maleinated polybutadiene (B), 51.6 g of deionized water and 32.4 g of triethylamine to form a mixture which was vigorously agitated for 60 minutes, incorporated with 36 g of n-butylcellosolve at room temperature, kneaded with the same amounts of the same pigments as in Example 1 in quite the same manner as in Example 1 and diluted with deionized water thereby obtaining an electrophoretic aqueous solution having a solid matter content of 12%. The solution so obtained was introduced into a 2-liter stainless steel-made beaker which was used as the bath for electrophoretic coating and as the cathode, while a steel plate treated with zinc phosphate (this phosphatized plate being produced by Nippon Test Panel Co., Ltd., Japan) was as the anode. Thus, electrophoretic coating was effected by deposition on the anode. The test results are shown in Table 1.

Comparative example 2

The procedure for the preparation of the polybutadiene in Example 1 was followed except that 25 mol of toluene was used, thereby to prepare a butadiene polymer (C) having an iodine value of 434, 58% of 1,2-linkage, a number average molecular weight of 1200 and a viscosity of 37 poise (at 25° C.).

Then, the procedure for the preparation of the maleinated polybutadiene in Comparative example 1 was followed except that the butadiene polymer (C) was substituted for the butadiene polymer (A), thereby to prepare a maleinated polybutadiene (C') having an acid value of 97 and a bubble viscosity of $Z_2$-$Z_3$.

A 2-liter separable flask provided with a reflux condenser was charged with 180 g of the maleinated polybutadiene (C'), 51.6 g of deionized water and 32.4 g of triethylamine to form a mixture which was agitated vigorously at 60° C. for 60 minutes, incorporated with 36 g of n-butylcellosolve at room temperature and then kneaded with the same amounts of the same pigments as in Example 1 in quite the same manner as in Example 1, thereby obtaining an electrophoretic aqueous solution having a solid matter content of 12%. The thus-obtained solution was placed in a 2-liter stainless steel-made beaker which was used as the bath for electrophoretic coating and as the cathode, while the same phosphatized steel plate as above was used as the anode, thereby effecting electrophoretic coating by deposition on the anode. The test results are shown in Table 1.

Comparative example 3

A 2-liter stainless steel-made autoclave was purged with nitrogen and then charged with 900 g of the butadiene polymer (A) of Example 1, 125 g of an 80% wt.% xylene solution of a thermally decomposed product of polyisoprene (this product having a molecular weight of 13,000 and being supplied under the tradename of Isolene D-400 by Hardman Co., Ltd.) as a polyunsaturated liquid compound, 2 g of Antigen 3C and 205 g of maleic anhydride to form a mixture which was reacted at 195° C. for 6 hours thereby obtaining a reaction mixture.

The reaction mixture so obtained was treated to distil off the unreacted maleic anhydride and the xylene at a reduced pressure thereby to prepare a maleinated polybutadiene (D) having an acid value of 97 and a bubble viscosity of V-W.

To a 2-liter separable flask provided with a reflux condenser were added 180 g of the maleinated polybutadiene (D), 51.6 g of deionized water and 32.4 g of triethylamine to form a mixture. The mixture so obtained was agitated vigorously at 60° C. for 60 minutes, incorporated with 36 g of n-butylcellosolve at room temperature, then kneaded with the same amounts of the same pigments as in Example 1 in quite the same manner as in Example 1, and then diluted with deionized water thereby to prepare an electrophoretic aqueous solution having a solid matter content of 12%. The solution so prepared was introduced into a 2-liter stainless steel-made beaker which was used as the bath for electrophoretic coating and as the cathode, while the same phosphatized steel plate as in Example 1 was used as the anode, thereby effecting electrophoretic coating by deposition on the anode. The test results are shown in Table 1.

As is apparent from the comparison between Example 1 and Comparative examples 1-3, the electrophoretic aqueous solution obtained in Example 1 exhibited remarkably improved throwing power and edge covering power as compared with those obtained in Comparative examples 1-3. This clearly indicates that very excellent electrophoretic coating compositions may be obtained according to this invention.

Table 1

| | | Example 1 | Comparative example 1 | Comparative example 2 | Comparative example 3 |
|---|---|---|---|---|---|
| Conditions | Voltage for coating (V) | 410 | 120 | 260 | 160 |

Table 1-continued

|  |  | Example 1 | Comparative example 1 | Comparative example 2 | Comparative example 3 |
|---|---|---|---|---|---|
| for coating | Time for coating (min) | 3 | 3 | 3 | 3 |
|  | Baking condition (°C. × min) | 160 × 30 | 160 × 30 | 160 × 30 | 160 × 30 |
|  | Thickness of coating formed (μ) | 20 | 20 | 20 | 20 |
|  | Pencil hardness | 3H | 3H | 2H | 3H |
|  | Cross cut test (Tape test) | 100/100 | 97/100 | 95/100 | 100/100 |
|  | Ericksen (mm) | 6.9 | 4.9 | 6.5 | 3.5 |
| Physical test | Impact strength, Surface (cm)*1 | 30 | 20 | 30 | 20 |
|  | Impact strength, Reverse (cm) | <10 | <10 | <10 | <10 |
|  | Throwing power (cm)*2 | 23.3 | 11.5 | 14.0 | 12.5 |
|  | Edge covering power (mm)*3 | 0 | 3 | 3 | 2.0 |
|  | Alkali resistance (hr)*4 | 7.0 | 3 | 4 | 5.5 |
|  | Acid resistance (hr)*5 | 180 | 150 | 150 | 160 |
| Chemical test | Water resistance (day)*6 | No change | No change | No change | No change |
|  | Solvent resistance (day)*7 | " | " | " | " |
|  | Corrosion resistance (mm)*8 | 1.0 | 1.0 | 1.0 | 1.0 |

*1Maximum height of portion extruded without destruction of coating (500 g, 1/2 B)
*2Ford pipe method
*3Expressed as width of test panel edge portion rusted by spraying a 5% aqueous solution of NaCl.
*4Time passed before creation of blister or other changes in coating (when immersed in 5% NaOH)
*5Same as above (5% $H_2SO_4$)
*6Same as above (40°C. × 40 days)
*7Same as above (when immersed in toluene/xylene (1:1 by volume) mixed solvent for 30 days)
*8Maximum width of rusted portion originated from a cut through coating (5% aqueous solution of NaCl sprayed for 100 hours)

Comparative example 4

A 2-liter stainless steel-made autoclave was charged with 1000 g of linseed oil having an iodine value of 180 and a molecular weight of about 800, 205 g of maleic anhydride and 50 g of xylene to form a mixture which was reacted at 190° C. under a nitrogen stream to obtain a reaction mixture. The reaction mixture so obtained was treated to distil off the unreacted maleic anhydride and the xylene under a reduced pressure thereby to obtain a maleinated linseed oil (A) having an acid value of 97 and a viscosity of 43 poise (at 25° C.). Then, 200 g of the thus-obtained maleinated linseed oil (A) and 40 g of diglyme were charged into a 2-liter stainless steel-made beaker and then dissolved. The resulting solution was incorporated with 37.9 g of triethylamine, agitated at room temperature for 60 minutes, incorporated with 388.8 g of deionized water and then agitated vigorously thereby to prepare an aqueous solution having a resinous solid matter content of 30 wt.%. A 2-liter stainless steel-made beaker was charged with 600 g of the thus-prepared 30 wt.% aqueous solution of the resinous solid matter, 726 g of titania, 12 g of carbon black, 24 g of strontium chromate and 1300 g of glass beads to form a mixture which was stirred vigorously on a high speed rotary mixer for two hours and then filtered to remove the glass beads thereby preparing a pigment paste (E) capable of being satisfactorily dispersed in water.

Comparative example 5

A 2-liter stainless steel-made autoclave was charged with 1000 g of linseed oil having an iodine value of 180 and molecular weight of about 800, 205 g of maleic anhydride and 50 g of xylene to form a mixture which was reacted at 190° C. for 8 hours under a nitrogen stream. The reaction mixture was treated to distil off the unreacted maleic anhydride and the xylene at a reduced pressure thereby preparing a maleinated linseed oil having an acid value of 97 and viscosity of 43 poise (at 25° C.). Then, 200 g of the maleinated linseed oil and 40 g of diglyme were introduced into a 2-liter stainless steel-made beaker to form a solution which was incorporated with 37.9 g of triethylamine, stirred at room temperature for 60 minutes, incorporated with 388.8 g of deionized water and then stirred vigorously thereby to prepare a 30 wt.% aqueous solution of resinous solid matter. A 2-liter stainless steel-made beaker was charged with 600 g of the 30 wt.% solution so prepared, 726 g of titania, 24 g of carbon black, 24 g of strontium chromate and 1300 g of glass beads to form a mixture which was stirred vigorously on a high speed rotary mixer for two hours and then filtered to remove the glass beads thereby obtaining a pigment paste (E) which may be dispersed satisfactorily.

EXAMPLE 2

A 2-liter stainless steel-made autoclave was purged with nitrogen and then charged with 977 g of the butadiene polymer (A) of Example 1, 230 g of a 10 wt.% xylene solution of a cis-1,4-polybutadiene rubber having a molecular weight of about 250,000, 205 g of maleic anhydride and 2 g of Antigen 3C to form a mixture which was reacted at 195° C. for 6 hours. The resulting reaction mixture was treated to distil off the unreacted maleic anhydride and the xylene at a reduced pressure thereby to prepare a maleinated polybutadiene (F) having an acid value of 97 and a bubble viscosity of Z.

Thus, a 2-liter separable flask provided with a reflux condenser was charged with 180 g of the maleinated polybutadiene (F) and 36 g of diglyme to form a solution thereof. The solution so formed was incorporated with 32.4 g of triethylamine, agitated at room temperature for 60 minutes, incorporated with 651.6 g of deionized water and then agitated vigorously thereby obtaining a 20 wt.% of a varnish. The varnish so obtained was incorporated with 159.7 g of the pigment paste (E) of Comparative example 4, mixed thoroughly and then incorporated with 1363.9 g of deionized water thereby to prepare an aqueous electrophoretic solution having a solid matter content of 12 wt.%. The aqueous electrophoretic solution so prepared was put in a 2-liter stainless steel-made beaker and used in the formation of an electrophoretic coating by deposition on the anode in quite the same manner as in Example 1. The results are indicated in Table 2.

EXAMPLE 3

A 2-liter stainless steel-made autoclave was purged with nitrogen and then charged with 982.5 g of the butadiene polymer (A) of Example 1, 175.0 g of a 10 wt.% xylene solution of SBR having a molecular weight of about 10,000–100,000, 205.0 g of maleic anhydride and 2 g of Antigen 3C to form a mixture which was reacted at 195° C. for 6 hours. The resulting reaction mixture was treated to distil off the unreacted maleic anhydride and the xylene at a reduced pressure thereby to prepare a maleinated polybutadiene (G) having an acid value of 97 and a bubble viscosity of Z.

Then, 180 g of the maleinated polybutadiene (G) so prepared and 36 g of diglyme were introduced into a 2-liter separable flask provided with a reflux condenser to form a solution which was incorporated with 32.4 g of triethylamine, agitated at room temperature for 60 minutes, incorporated with 651.6 g of deionized water and then stirred vigorously to prepare a varnish containing 20 wt.% of solid matter. The varnish so prepared was incorporated with 159.7 g of the pigment paste (E) of Comparative example 4, mixed thoroughly and incorporated with 1363.9 g of deionized water to prepare an electrophoretic aqueous solution having a solid matter content of 12 wt.%. The solution so prepared was introduced into a 2-liter stainless steel-made beaker and used in the formation of an electrophoretic coating by deposition on the anode. The test method used was identical with that as indicated in Table 1.

EXAMPLE 4

A mixture of 50 g of the butadiene polymer (A) of Example 1, 2.5 g of polybutadiene having a molecular weight of about 250,000 prepared by polymerization of butadiene in the present of butyl lithium as the catalyst and 47.5 g of linseed oil, was incorporated with 16.3 g of maleic anhydride, 0.2 g of Antigen 3C and 30 g of xylene, and the whole was addition reacted at 200° C. for 8 hours to obtain a reaction mixture. The reaction mixture so obtained was treated to distil off the unreacted maleic anhydride and the xylene thereby obtaining an addition reacted product having an acid value of 80. The product so obtained was subjected to water solubilization treatment in the same manner as in Example 3 and then used in electrophoretic coating as indicated in Example 3. The results are shown also in Table 2.

Table 2

|  |  | Example 2 | Example 3 | Example 4 |
|---|---|---|---|---|
| Conditions for coating | Voltage for coating (V) | 330 | 310 | 300 |
|  | Time for coating (min) | 3 | 3 | 3 |
|  | Baking condition (°C. × min) | 160 × 30 | 160 × 30 | 160 × 30 |
|  | Thickness of coating formed (μ) | 20 | 20 | 20 |
| Physical test | Pencil hardness | 3H | 2H | 2H |
|  | Cross cut test (tape test) | 100/100 | 100/100 | 100/100 |
|  | Ericksen (mm) | 5.6 | 4.2 | 7.0 |
|  | Impact strength, Surface (mm) | 40 | 30 | 50 |
|  | Impact strength, Reverse (mm) | <10 | <10 | 20 |
|  | Throwing power (cm) | 19.5 | 19.0 | 18.5 |
|  | Edge covering power (mm) | 0 | 0 | 0 |
| Chemical test | Alkali resistance (hr) | 6.0 | 6.0 | 3.0 |
|  | Acid resistance (hr) | 170 | 170 | 170 |
|  | Water resistance (day) | No change | No change | No change |
|  | Solvent resistance (day) | " | " | " |
|  | Corrosion resistance (mm) | 1.0 | 1.0 | 1.0 |

EXAMPLE 5

The procedure of Example 1 was followed except that in the malination reaction, 100 g of a 20 wt.% xylene solution of 1,2-polybutadiene resin JSR.RB810 having a softening point of 75° C. and molecular weight of 100,000 (produced by Japan Synthetic Rubber Co., Ltd., Japan), 780 g of the butadiene polymer (A) and a reaction time of 8 hours were substituted for the 175 g of the 10 wt.% xylene solution of diene NF-35, the 982.5 g of the butadiene polymer (A) and the reaction time of 6 hours, respectively, and except that in the incorporation of pigments, 57.3 g of titania, 0.9 g of carbon black and 1.8 g of strontium chromate were substituted for the 66.1 g of titania, 2.2 g of carbon black and 2.2 g of strontium chromate, respectively. The test results are shown in Table 3.

Comparative example 6–8

In these Comparative examples, the procedures of Comparative examples 1–3 were followed except that in corrosion resistance test, 5% aqueous solution of NaCl was sprayed for 200 hours in substitution for the 100 hours, respectively. The test results are shown in Table 3.

Reference example 1

The procedure of Comparative example 4 was followed except that in maleination, a thermally polymerized linseed oil having a viscosity of 10 poise (at 25° C.) was substituted for the linseed oil having an iodine value of 180 and a maleinated linseed oil obtained had a viscosity of 3000 poise (at 25° C.) and except that in incorporating pigments, 763 g of titania and 12 g of carbon black were used.

Table 3

|  |  | Example 7 | Comparative example 6 | Comparative example 7 | Comparative example 8 |
|---|---|---|---|---|---|
| Conditions for coating | Voltage for coating (V) | 400 | 120 | 260 | 160 |
|  | Time for coating (min) | 3 | 3 | 3 | 3 |
|  | Baking condition (°C. × min) | 160 × 30 | 160 × 30 | 160 × 30 | 160 × 30 |
|  | Thickness of coating formed (μ) | 20 | 20 | 20 | 20 |
| Physical test | Pencil hardness | 3H | 3H | 2H | 3H |
|  | Cross cut test (Tape test) | 100/100 | 97/100 | 95/100 | 100/100 |
|  | Ericksen (mm) | 7.2 | 4.9 | 6.5 | 3.5 |
|  | Impact strength, Surface (cm) | 40 | 20 | 30 | 20 |
|  | Impact strength, Reverse (cm) | 10 | <10 | <10 | <10 |
|  | Throwing power (cm) | 23.3 | 11.5 | 14.0 | 12.5 |
|  | Edge covering power (mm) | 0 | 3 | 3 | 2.0 |
|  | Alkali resistance (hr) | 7.0 | 3 | 4 | 5.5 |

| | | Example 7 | Comparative example 6 | Comparative example 7 | Comparative example 8 |
|---|---|---|---|---|---|
| | Acid resistance (hr) | 180 | 150 | 150 | 160 |
| Chemical test | Water resistance (day) | No change | No change | No change | No change |
| | Solvent resistance (day) | " | " | " | " |
| | Corrosion resistance (mm)*9 | 1.0 | 5.0 | 3.5 | 4.0 |

*9Maximum width of rusted portion originated from a cut through coating (5% aqueous solution of NaCl sprayed for 200 hours)

EXAMPLE 6

A 2-liter stainless steel-made autoclave was purged with nitrogen and then charged with 970 g of a butadiene polymer (F') having an iodine value of 425, number average molecular weight of 1000 and 57% of 1,2-linkage, the polymer (F') being prepared by following the procedure of Example 1 except that the amount of toluene used was 27.5 mol, 30 g of 1,2-polybutadiene resin JSR-RB810 (produced by Japan Synthetic Rubber Co., Ltd.) having a molecular weight of about 100,000 and softening point of 75° C., 205 g of maleic anhydride, 2 g of Antigen 3C and 10 g of xylene to form a mixture which was reacted at 195° C. for 6 hours. The resulting reaction mixture was treated to remove the unreacted maleic anhydride and the xylene at a reduced pressure thereby to prepare a maleinated polybutadiene (F') having an acid value of 97 and viscosity of 13000 poise (at 25° C.).

Then, 180 g of the maleinated polybutadiene (F') and 36 g of diglyme were added to a 2-liter separable flask provided with a reflux condenser to form a solution which was incorporated with 32.4 g of triethylamine, stirred at room temperature for 60 minutes, incorporated with 651.6 g of deionized water and stirred vigorously thereby to prepare a 20 wt.% varnish. The varnish so prepared was incorporated with 113.6 g of the pigment paste (E) prepared in Reference example 1, mixed thoroughly and incorporated with 1149.1 g of deionized water thereby preparing an electrophoretic aqueous solution having a solid matter content of 12 wt.%. The solution so prepared was put in a 2-liter stainless steel-made beaker for effecting therein electrophoretic coating by deposition on the anode. The results are shown in Table 4.

mixture was treated to distil the unreacted maleic anhydride and the xylene at a reduced pressure thereby obtaining a maleinated butadiene (G') having an acid value of 97 and viscosity of 4200 poise (at 25° C.).

A 12 wt.% electrophoretic aqueous solution of solid matter was prepared in quite the same manner as in Example 6 and it was used in forming an electrophoretic coating by deposition on the anode. The results are shown in Table 4.

EXAMPLE 7

To a 2-liter separable flask provided with a reflux condenser were added 960 g of the butadiene polymer (F') prepared in Example 6, 40 g of 1,2-polybutadiene resin JSR-RB820 (Nippon Synthetic Rubber Co., Ltd.) having a molecular weight of about 100,000 and softening point of 85° C., 205 g of maleic anhydride, 2 g of Antigen 3C and 10 g of xylene. The resulting mixture was reacted at 190° C. for 8 hours under a nitrogen stream. Then, nitrogen gas blown into the resulting reaction mixture at 160° C. for 30 minutes to distil off the unreacted maleic anhydride and the xylene thereby to prepare a maleinated polybutadiene (G') having an acid value of 97 and viscosity of 120,000 poise (25° C.).

Ninety (90) g of the maleinated polybutadiene (G') and 90 g of the maleinated linseed oil (A) prepared in Reference example 1 were charged into a 2-liter separable flask where the whole was heated to 60° C., stirred thoroughly, incorporated with 35.0 g of triethylamine and 40 g of deionized water, stirred vigorously for one hour, incorporated with 40 g of butylcellosolve at room temperature to be made homogeneous and then incorporated slowly with 602 g of deionized water with vigorous agitation, thereby to prepare a 20 wt.% varnish. The varnish so prepared was mixed with 113.6 g of Table 4

| | | Example 6 | Comparative example 7 | Example 7 | Example 8 | Example 9 | Example 10 |
|---|---|---|---|---|---|---|---|
| Conditions for coating | Voltage for coating (V) | 360 | 200 | 300 | 460 | 310 | 280 |
| | Time for coating (min) | 3 | 3 | 3 | 3 | 3 | 3 |
| | Baking condition (°C. × min) | 160 × 30 | 160 × 30 | 160 × 30 | 160 × 30 | 160 × 30 | 160 × 30 |
| | Thickness of coating formed (μ) | 20 | 20 | 20 | 20 | 20 | 20 |
| | Pencil hardness | 3H | 3H | 2H | 2H | 3H | HB |
| | Cross cut test (tape test) | 100/100 | 100/100 | 100/100 | 100/100 | 100/100 | 100/100 |
| | Ericksen (mm) | 8.3 | 5.2 | 9.0 | 9.0 | 8.0 | 9.0 |
| Physical test | Impact strength, Surface (cm) | >50 | 3.0 | >50 | >50 | 30 | >50 |
| | Impact strength, Reverse (cm) | >50 | <10 | >50 | >50 | <10 | >50 |
| | Throwing power (cm) | 24.0 | 15.0 | 18.0 | 28.0 | 19.0 | 16 |
| | Edge covering power (mm) | 0 | 3 | 1 | 0 | 1 | 0 |
| | Alkali resistance (hr) | 10.0 | 4 | 2 | 15.0 | 5 | 15 |
| | Acid resistance (hr) | 200 | 150 | 100 | >200 | 150 | 200 |
| Chemical test | Water resistance (day) | No change | No change | No change | No change | No change | No change |
| | Solvent resistance (day) | " | " | " | " | " | " |
| | Corrosion resistance(mm) | 0.5 | 3.0 | 1.0 | 0.5 | 1.0 | 1.0 |

Comparative example 7

A 2-liter stainless steel-made autoclave was charged with 1000 g of the butadiene polymer (F') prepared in Example 6, 205 g of maleic anhydride, 2 g of Antigen 3C and 10 g of xylene to form a mixture which was reacted at 195° C. for 6 hours. The resulting reaction the pigment paste (E) as prepared in Reference example 1, mixed thoroughly and then incorporated with deionized water thereby to prepare an electrophoretic aqueous solution having a 12 wt.% solid matter content. The solution so prepared was introduced into a 2-liter stainless steel-made beaker wherein it formed an electrophoretic coating by deposition on the anode in quite the same manner as in Example 5. The results are indicated in Table 4.

EXAMPLE 8

A 2-liter separable flask provided with a reflux condenser was charged with 970 g of a butadiene polymer (H) having an iodine value of 450, 65% of 1,2-linkage and a number average molecular weight of 2000, the polymer (H) being prepared by following the procedure of Example 5 except that the amount of toluene used was 10 mol, 30 g of 1,2-polybutadiene resin JSR-RB810 (produced by Japan Synthetic Rubber Co., Ltd.) having a molecular weight of about 100,000 and softening point of 75° C., 117 g of maleic anhydride, 2.0 g of Antigen 3C and 10 g of xylene to form a mixture which was reacted at 195° C. for 6 hours under a nitrogen stream. Then, nitrogen gas was blown into the resulting reaction mixture at 160° C. for 30 minutes to distil therefrom the unreacted maleic anhydride and the xylene thereby obtaining a maleinated polybutadiene (H') having an acid value of 60 and viscosity of 32,000 poise (25° C.).

Then, 180 g of the maleinated polybutadiene (H'), 36 g of diglyme, 21.0 g of triethylamine and 36 g of deionized water were introduced into a 2-liter separable flask provided with a reflux condenser wherein the resulting mixture was agitated vigorously for 3 hours and incorporated with 627 g of deionized water thereby obtaining a 20 wt.% aqueous solution. The solution so obtained was incorporated with 113.6 g of the pigment paste prepared in Reference example 1, agitated thoroughly and incorporated with deionized water thereby obtaining an electrophoretic aqueous solution having a 12 wt.% solid matter content. The solution so obtained was put in a 2-liter stainless steel-made beaker wherein electrophoretic coating is effected by deposition on the anode in quite the same manner as in Example 5. The results are shown in Table 4.

EXAMPLE 9

A 2-liter separable flask provided with a reflux condenser was charged with 720 g of the butadiene polymer (F') prepared in Example 6, 30 g of 1,2-polybutadiene resin JSR-RB810 (produced by Japan Synthetic Rubber Co., Ltd.) having a molecular weight of about 100,000 and softening point of 75° C., 250 g of a thermally polymerized linseed oil having a viscosity of 10 poise (25° C.) as used in Reference example 1, 2.0 g of Antigen 3C and 10 g of xylene. The resulting mixture was reacted at 195° C. for 6 hours under a nitrogen stream. Nitrogen gas was blown into the resulting reaction mixture at 160° C. for 30 minutes to distil off the unreacted maleic anhydride and the xylene thereby obtaining a maleinated material (I').

Then, 180 g of the maleinated material (I'), 36 g of diglyme, 32.5 g of triethylamine and 40 g of deionized water were put in a 2-liter separable flask. The resulting mixture was agitated vigorously at room temperature for 3 hours and incorporated with 611.5 g of deionized water to prepare a 20 wt.% aqueous solution. The thus-prepared solution was incorporated with 113.6 g of the pigment paste prepared in Reference example 1, mixed thoroughly and then incorporated with deionized water thereby to obtain an electrophoretic coating solution having a 12 wt.% solid matter content. The solution so obtained was put in a 2-liter stainless steel-made beaker wherein electrophoretic coating was effected by deposition on the anode in quite the same manner as in Example 5. The results are indicated in Table 4.

EXAMPLE 10

A 2-liter separable flask provided with a reflux condenser was charged with 200 g of the maleinated polybutadiene (H') prepared in Example 8, 6.9 g of methanol, 13 g of triethylamine and 40 g of diglyme to form a mixture which was reacted at 60° C. for two hours to prepare a semi-esterified maleinated polybutadiene. The thus-prepared maleinated polybutadiene was incorporated with deionized water to prepare a 20 wt.% varnish in quite the same manner as in Example 8. The varnish so prepared was incorporated with the pigment paste (E) in the same manner as in Example 8 thereby to obtain an electrophoretic coating composition. The coating composition was used in forming an electrophoretic coating by deposition on the anode. The results are shown in Table 4.

What is claimed is:

1. An electrophoretic coating composition comprising as an essential component a film-forming ingredient prepared by:

addition reacting a mixture of (a) 99–90 parts by weight of a liquid conjugated diene polymer having at least 50% of 1,2-linkage and a molecular weight of 500–3,000 and (b) 1–10 parts by weight of a member selected from the group consisting of (i) synthetic rubbers having a molecular weight of at least 50,000 and being prepared by polymerizing at least one conjugated diene having 4–10 carbon atoms or copolymerizing said at least one conjugated diene with at least one vinyl monomer, (ii) natural rubber, and (iii) 1,2-polybutadiene resins having a molecular weight of at least 50,000, a crystallization degree of 5–50% and a softening point of 50°–150° C., with 5–30% by weight, based on said mixture, of an $\alpha,\beta$-dicarboxylic acid or anhydride thereof to obtain an adduct (P) with said acid or anhydride thereof, neutralizing with an alkaline compound at least one member selected from the group consisting of the thus-obtained adduct (P) and a modified adduct (P') prepared by reaction of the adduct (P) with an alcohol selected from the group consisting of methanol, ethanol, propanol, butanol, ethylcellosolve, propylcellosolve, butylcellosolve, diacetone alcohol, and then dispersing or dissolving at least one member selected from the group consisting of the thus-neutralized adduct (P) and (P') in water to obtain the film-forming ingredient.

2. An electrophoretic coating composition according to claim 1, wherein the addition reaction is effected at 100°–300° C., and the esterification and neutralization are each effected at 0°–100° C.

3. An electrophoretic coating composition according to claim 1, wherein the $\alpha,\beta$-unsaturated dicarboxylic or anhydride thereof is maleic acid, maleic anhydride, citraconic acid, citraconic anhydride, chloromaleic acid or chloromaleic anhydride; and the alkaline compound is ammonia, diethylamine, triethylamine, monoethanolamine, diethanolamine, triethanolamine or an inorganic alkali.

4. An electrophoretic coating composition comprising as an essential component a film-forming ingredient prepared by dispersing or dissolving in water (I) 30–100 parts by weight of at least one member selected from the group consisting of (1) a neutralized adduct (P) prepared by:

addition reacting a mixture of (a) 99–90 parts by weight of a liquid conjugated diene polymer having at least 50% of 1,2-linkage and a molecular weight of 500–3,000 and (b) 1–10 parts by weight of a member selected from the group consisting of (i) synthetic rubbers having a molecular weight of at least 50,000 and being prepared by polymerizing at least one conjugated diene having 4–10 carbon atoms or copolymerizing said at least one conjugated diene with at least one vinyl monomer, (ii) natural rubber, and (iii) 1,2-polybutadiene resins having a molecular weight of at least 50,000, a crystallization degree of 5–50% and a softening point of 50°–150° C., with 5–30% by weight, based on said mixture, of an α,β-dicarboxylic acid or anhydride thereof to obtain an adduct (P), neutralizing the thus-obtained adduct (P) with an alkaline compound to obtain the neutralized adduct (P) and (2) a neutralized modified adduct (P') prepared by:

reacting the adduct (P) with an alcohol selected from the group consisting of methanol, ethanol, propanol, butanol, ethylcellosolve, propylcellosolve, butylcellosolve, diacetone alcohol, to produce a modified adduct (P') and then neutralizing the thus-produced modified adduct (P') with an alkaline compound to obtain the neutralized modified adduct (P'), and (II) up to 70 parts of weight of at least one member selected from the group consisting of (1) a neutralized adduct (Q) prepared by:

addition reacting a natural drying oil or a thermally polymerized product thereof with 5–30% by weight, based on said drying oil or thermally polymerized product thereof, of an α,β-unsaturated dicarboxylic acid or anhydride thereof to obtain an adduct (Q), neutralizing the thus-obtained adduct (Q) with an alkaline compound to obtain the neutralized adduct (Q) and (2) a neutralized modified adduct (Q') prepared by:

reacting the adduct (Q) with an alcohol selected from the group consisting of methanol, ethanol, propanol, butanol, ethylcellosolve, propylcellosolve, butylcellosolve, diacetone alcohol, to produce a modified adduct (Q') and then neutralizing the thus-produced modified adduct (Q') with an alkaline compound to obtain the neutralized modified adduct (Q').

5. An electrophoretic coating composition according to claim 4, wherein the two addition reactions are each effected at 100°–300° C., the two esterifications and neutralizations are each effected at 0°–100° C.

6. An electrophoretic coating composition according to claim 4, wherein the α,β-unsaturated dicarboxylic acid or anhydride thereof is maleic acid, maleic anhydride, citraconic acid, citraconic anhydride, chloromaleic acid or chloromaleic anhydride; the alkaline compound is ammonia, diethylamine, triethylamine, monoethanolamine, diethanolamine, triethanolamine or an inorganic alkali; and the natural drying oil or thermally polymerized product thereof is linseed oil, tung oil, dehydrated castor oil, sufflower oil, soyabean oil or a thermally polymerized product prepared by heating said oil to 200°–300° C.

7. An electrophoretic coating composition comprising as an essential component a film-forming ingredient prepared by:

addition reacting a mixture of (a) 99–90 parts by weight of a liquid conjugated diene polymer or copolymer having at least 50% of 1,2linkage and a molecular weight of 500–3,000, (b) 1–10 parts by weight of a member selected from the group consisting of (i) synthetic rubbers having a molecular weight of at least 50,000 and being prepared by polymerizing at least one conjugated diene having 4–10 carbon atoms or copolymerizing said at least one conjugated diene with at least one vinyl monomer, (ii) natural rubber, and (iii) 1,2-polybutadiene resins having a molecular weight of at least 50,000, a crystallization degree of 5–50% and a softening point of 50°–150° C. and (c) up to 70 parts by weight of a natural drying oil or a thermally polymerized product thereof, with 5–30% by weight, based on said mixture, of an α,β-unsaturated dicarboxylic acid or anhydride thereof to obtain an adduct (R), neutralizing with an alkaline compound at least one member selected from the group consisting of the thus-obtained adduct (R) and a modified adduct (R') prepared by reaction of the adduct (R) with an alcohol selected from the group consisting of methanol, ethanol, propanol, butanol, ethylcellosolve, propylcellosolve, butylcellosolve, diacetone alcohol, 4-methyl-4-methoxypentanone-2, ethylene glycol dimethyl ether and diethylene glycol dimethylether, and then dispersing or dissolving the thus-neutralized product in water to obtain the film-forming ingredient.

8. An electrophoretic coating composition according to claim 7, wherein the addition reaction is effected at 100°–300° C., and the esterification and neutralization are each effected at 0°–100° C.

9. An electrophoretic coating composition according to claim 7, wherein the α,β-unsaturated dicarboxylic acid or anhydride thereof is maleic acid, maleic anhydride, citraconic acid, citraconic anhydride, chloromaleic acid or chloromaleic anhydride; the alkaline compound is ammonia, diethylamine, triethylamine, monoethanolamine, diethanolamine, triethanolamine or an inorganic alkali; and the natural drying oil or thermally polymerized product thereof is linseed oil, tung oil, dehydrated castor oil, sufflower oil, soyabean oil or a thermally polymerized product prepared by heating said oil to 200°–300° C.

10. An electrophoretic coating composition comprising as an essential component a film-forming ingredient prepared by:

addition reacting a mixture of (a) 99–90 parts by weight of a liquid conjugated diene polymer having at least 50% of 1,2-linkage and a molecular weight of 500–3,000 and (b) 1–10 parts by weight of a member selected from the group consisting of (i) synthetic rubbers having a molecular weight of at least 50,000 and being prepared by polymerizing at least one conjugated diene having 4–10 carbon atoms or copolymerizing said at least one conjugated diene with at least one vinyl monomer, (ii) natural rubber, and (iii) 1,2-polybutadiene resins having a molecular weight of at least 50,000, a crystallization degree of 5–50% and a softening point of 50°–150° C., with 5–30% by weight, based on said mixture, of a α,β-dicarboxylic acid or anhydride thereof to obtain an adduct (P) with said acid or anhydride thereof, neutralizing with an alkaline compound at least one member selected from the group consisting of the thus obtained adduct (P) and a modified adduct (P') prepared by reaction of the adduct (P) with an aliphatic alcohol having less than three hydroxyl groups, and then dispersing or dissolving at least one member selected from the group consisting of the thus-neutralized adduct (P) and (P') in water to obtain the film-forming ingredient.

11. An electrophoretic coating composition comprising as an essential component a film-forming ingredient prepared by:

addition reacting a mixture of (a) 99–90 parts by weight of a liquid conjugated diene polymer having at least 50% of 1,2-linkage and a molecular weight of 500–3,000 and (b) 1–10 parts by weight of a member selected from the group consisting of (i) synthetic rubbers having a molecular weight of at least 50,000 and being prepared by polymerizing at least one conjugated diene having 4–10 carbon atoms or copolymerizing said at least one conjugated diene with at least one vinyl monomer, (ii) natural rubber, and (iii) 1,2-polybutadiene resins having a molecular weight of at least 50,000, a crystallization degree of 5–50% and a softening point of 50°–150° C., with 5–30% by weight, based on said mixture, of an $\alpha,\beta$-dicarboxylic acid or anhydride thereof to obtain an adduct (P) with said acid or anhydride thereof, neutralizing with an alkaline compound at least one member selected from the group consisting of the thus-obtained adduct (P) and a modified adduct (P') prepared by reaction of the adduct (P) with an aliphatic monohydric alcohol, and then dispersing or dissolving at least one member selected from the group consisting of the thus neutralized adduct (P) and (P') in water to obtain the film-forming ingredient.

* * * * *